Figure 1:
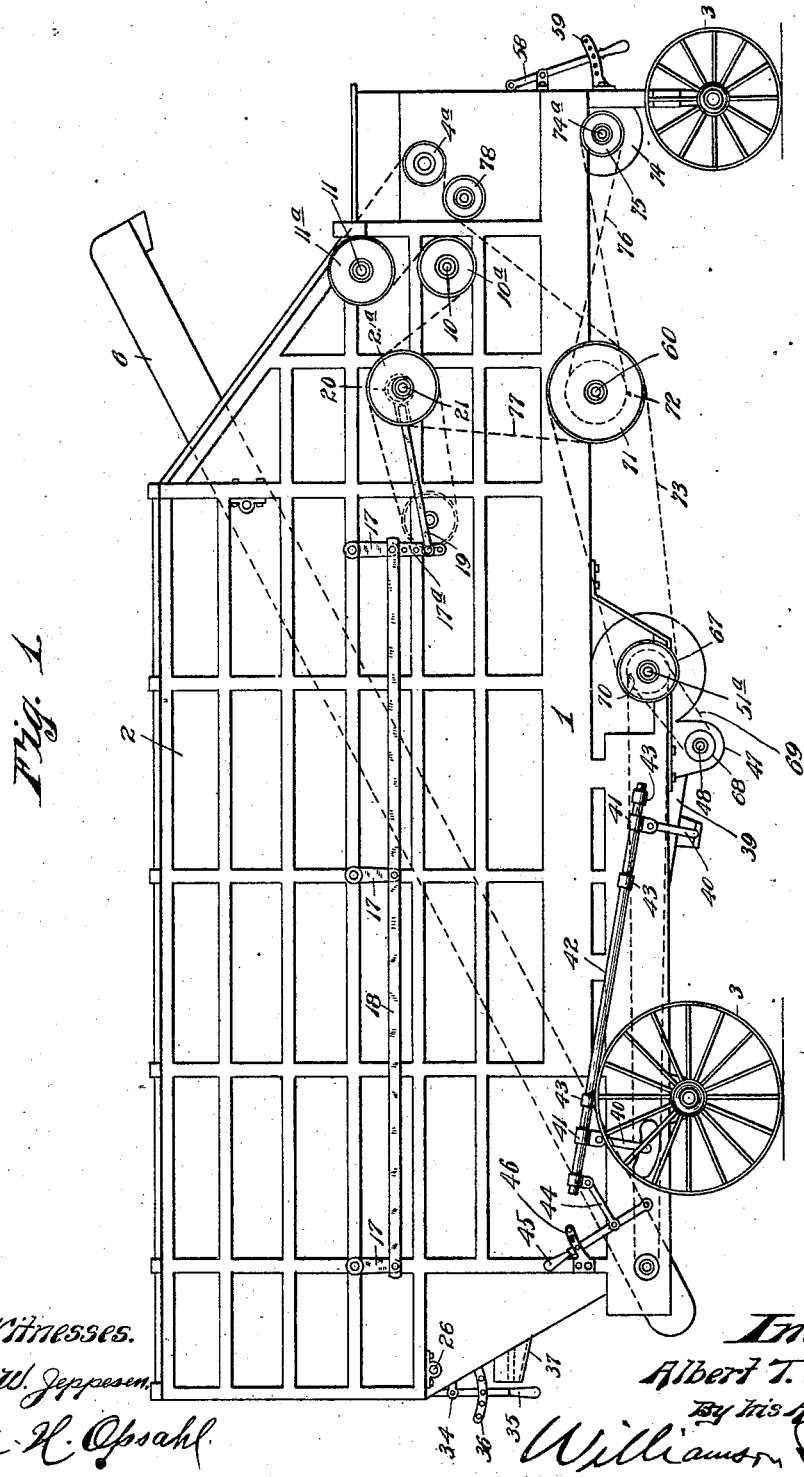

No. 857,147. PATENTED JUNE 18, 1907.
A. T. BAKKEN.
THRESHING MACHINE.
APPLICATION FILED DEC. 15, 1904.

3 SHEETS—SHEET 1.

Witnesses.
E. W. Jeppesen
A. H. Opsahl

Inventor:
Albert T. Bakken.
By his Attorneys.
Williamson Merchant

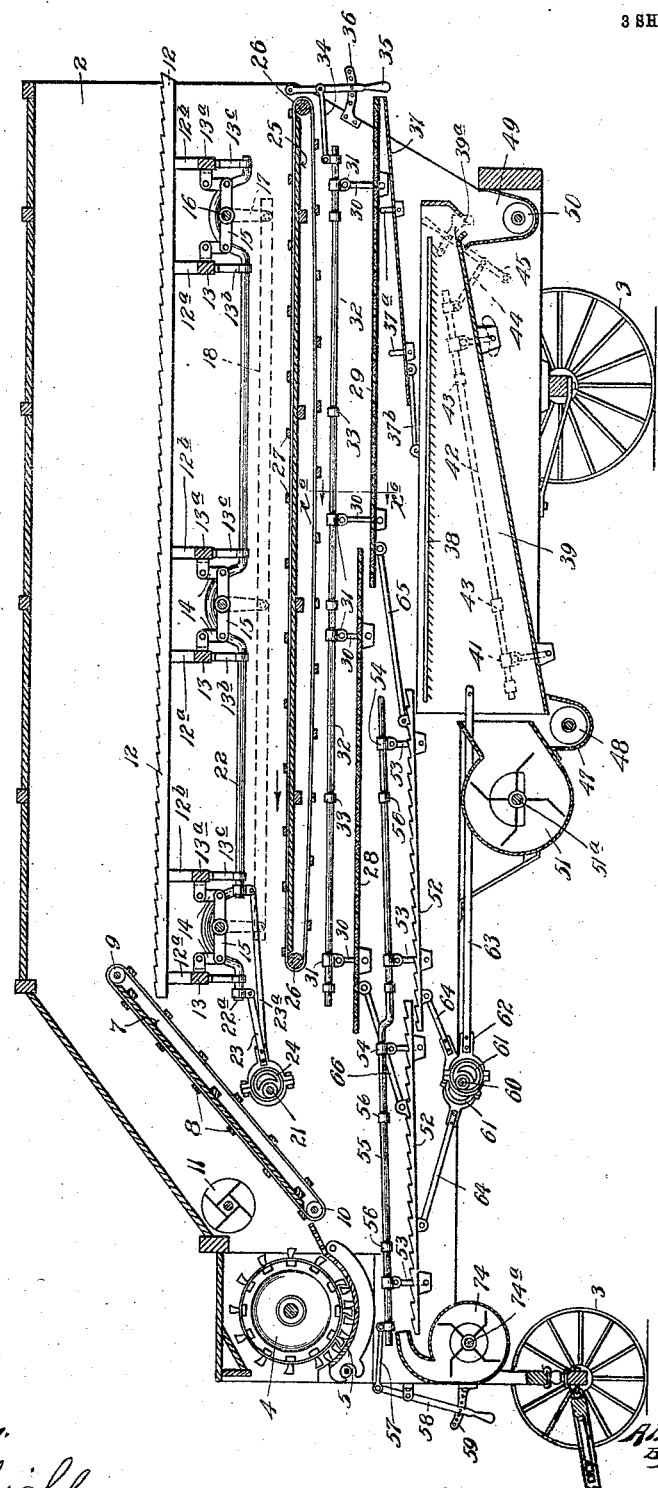

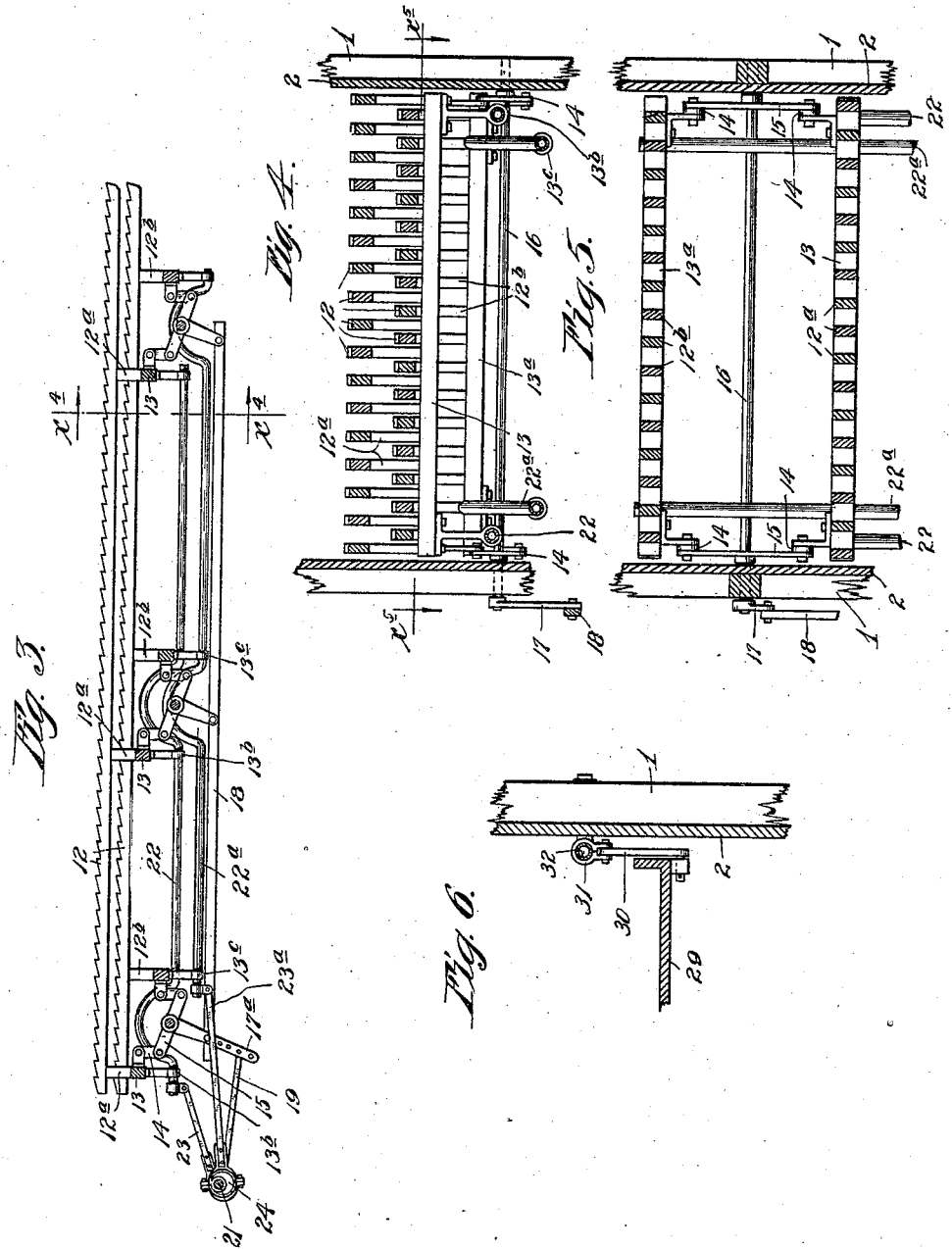

UNITED STATES PATENT OFFICE.

ALBERT T. BAKKEN, OF McINTOSH, MINNESOTA.

THRESHING-MACHINE.

No. 857,147.   Specification of Letters Patent.   Patented June 18, 1907.

Application filed December 15, 1904. Serial No. 236,919.

*To all whom it may concern:*

Be it known that I, ALBERT T. BAKKEN, a citizen of the United States, residing at McIntosh, in the county of Polk and State of Minnesota, have invented certain new and useful Improvements in Threshing-Machines; and I do hereby declare the following to be a full, clear, and exact description of the invention, such as will enable others skilled in the art to which it appertains to make and use the same.

My invention relates to threshing machines, and has for its object to improve the same in the several particulars hereinafter noted.

The invention consists of the novel devices and combinations of devices hereinafter noted and defined in the claims.

In the accompanying drawings which illustrate my invention, like characters indicate like parts throughout the several views.

Figure 1 is a view in side elevation showing a threshing machine embodying the several features of my invention. Fig. 2 is a vertical longitudinal section taken centrally through the threshing machine illustrated in Fig. 1. Fig. 3 is a detail in section on the same line as Fig. 2, showing the straw rake and its vibrating mechanism removed from the machine. Fig. 4 is a transverse section on the line $x^4 x^4$ of Fig. 3. Fig. 5 is a horizontal section on the line $x^5 x^5$ of Fig. 4; and Fig. 6 is a detail in section on the line $x^6 x^6$ of Fig. 2, some parts being broken away.

The numeral 1 indicates the separator frame, the numeral 2 the casing, the numeral 3 the wheels, the numeral 4 the threshing cylinder, the numeral 5 the coöperating toothed concave, and the numeral 6 the tailings elevator, which parts of the separator are of the usual construction.

The straw, and more or less grain and chaff, on passing from the threshing cylinder 4, is carried upward over an inclined deck 7 by an endless slat and belt conveyer 8 that runs over rollers 9 and 10 journaled in the sides of the case 2. The lower roller 10 drives the conveyer 8, and its shaft projects at one end and is provided with a pulley $10^a$. The threshing cylinder 4 is driven from the engine in the usual way, by a belt run over a pulley (not shown) on one end of its shaft, and the other end of its shaft carries a pulley $4^a$. A beater 11 mounted in the sides of the casing 2, works over the lower portions of the elevator conveyer 8, and its shaft projects at one end, and is provided with a pulley $11^a$. A straw rake, which is made up of a plurality of horizontally disposed serrated bars 12, receives from the elevator 8 and delivers the straw at the open rear end of the case 2. Alternate members of the bars 12 are rigidly connected, by short posts $12^a$, to transverse tie bars 13, while the intermediate bars 12 are likewise connected, by short posts $12^b$, to transverse tie bars $13^a$. The tie bars 13 and $13^a$ are arranged in pairs, and are connected by short links 14, to the opposite ends of rocker levers 15 that are carried by transverse shafts 16 mounted in the sides of the casing 2. The rock shafts 16 project at one end, and are provided with depending arms 17 that are connected for common movement by a long connecting rod 18. One of the arms 17, to-wit, as shown, the forward arm, has a perforated depending end $17^a$, to which is adjustably attached one end of an eccentric rod 19 that works on an eccentric 20 carried by an eccentric shaft 21 mounted in the sides of the case 2, and provided, at its outer end, with a pulley $21^a$.

Rigidly mounted in bearings $13^b$ on the tie bars 13, is a thrust rod 22, and rigidly mounted in similar bearings $13^c$ on the tie bars $13^a$, is a thrust rod $22^a$. The thrust rods 22 and $22^a$ are bent at certain points to clear the rock shafts 16 under movements imparted to the feed bars 12. The forward end of the thrust rod 22 is connected to eccentric rods 23, while the forward end of the thrust rod $22^a$ is connected to an eccentric rod $23^a$, which eccentric rods work on eccentric 24 carried by the eccentric shaft 21.

Under rocking movements of the rocker levers 15, the tie bars 13 and $13^a$, with their attached feed bars 12, are raised and lowered in reverse order. The eccentrics 24 are so timed with respect to the eccentrics 20 that the serrated feed bars 12 will be given longitudinal movements toward the rear of the machine while they are raised, and are given their return movements toward the front of the machine while they are lowered. Beneath the straw rake made up of the bars 12, is a horizontal imperforate deck 25 which is rigidly secured to the sides of the case 2. At the ends of the deck 25 are rollers 26 which are mounted in the sides of the case 2, and one of which is driven from certain other running parts of the machine.

Running over the deck 25, and over the rollers 26, in the direction indicated by the arrow marked in Fig. 2, is an endless slat and belt conveyer 27. This conveyer 27 takes up the grain and screenings dropped through the straw rack 12 onto the deck 25, and scrapes the same over said deck and off from the forward end thereof, from whence they drop onto a perforated screen plate 28, and from thence onto a second screen plate 2 . The screen plates 28 and 29 are suspended by links 30, from bearing lugs 31 that a rigid on horizontal thrust rods 32. These thrust rods 32 extend longitudinally of the case 2, and are mounted to slide in fixed bearings 33 on the sides of said case. The rods 32, as shown, at their rear ends, are connected by links 34, to set levers 35 that are adapted to be adjustably locked to latch segments 36, rigid on the sides of the case 2. An imperforate inclined return bottom 37 suspended by links 37$^a$, and receiving movement from connecting rod 37$^b$, underlies the rear end portion of the screen plate 29, and directs the grain and tailings backward and onto a sieve 38 which is carried by a vibrating shoe 39. This vibrating shoe 39 is supported by links 40 from link-supporting blocks 41 secured on rods 42 that are mounted to slide endwise through bearings 43 on the sides of the case 2. At their rear ends, as shown, the adjusting rods 42 are connected by links 44 to set levers 45, which levers are pivoted to the sides of the case 2, and co-operate with latch segments 46. The imperforate bottom of the shoe 39 inclines forward, and delivers the cleaned grain to a transverse spout 47, in which works a feed screw 48 of the usual construction. The sieve 38 at its rear end, delivers the chaff and tailings through an opening 39$^a$ in the bottom of the shoe 39, and into a transverse tailings spout 49. A feed screw 50 works in the spout 49, and delivers the tailings into the lower end of a tailings elevator 6, of the usual construction. A fan 51, supported from the machine frame in front of the shoe 39, blows a blast of air from front to rear through the shoe, and operates substantially in the usual way.

A pair of serrated feed pans 52 are supported for independent movements by short links 53 which are directly pivoted to supporting blocks 54, rigid on adjusting rods 55 that are mounted in suitable bearings 56 on the sides of the case 2. At their forward ends, the adjusting rods 55 are coupled by links 57 to set levers 58 that coöperate with latch segments 59 on the front end of the case. Below the pans 52 is a transverse shaft 60 that carries three eccentrics 61 on which work eccentric straps 62. One of the eccentric straps 62 is connected by a long pitman 63 to the shoe 39, while the other two eccentric straps are connected by pitmen 64, one to each of the pans 52. The rearmost pan 52 is connected by a link 65 to the rearmost screen plate 29, while the foremost feed pan 52 is connected to the foremost screen plate 28, by a link 66. The eccentrics 61 are preferably set 120 degrees apart, or on thirds of a circle. The shaft 51$^a$ of the fan 51 projects at one end, and is provided with a pulley 67. The shaft of the feed screw 48 projects at the same side of the machine, and is provided with a small pulley 68. A belt 69, indicated by dotted lines in Fig. 1, runs over the pulley 68 and over a pulley 70 on the fan shaft 51. The same side of the machine, the eccentric or crank shaft 60 is provided with pulleys 71 and 72; a belt 73, indicated by dotted lines, runs over the pulleys 67 and 71. Mounted at the extreme forward end of the machine case, is an auxiliary fan 74, the spout of which is arranged to direct a blast of air over the feed pans 52. The shaft 74$^a$ of this fan is provided at one end, in line with the pulley 72 of the shaft 60, with a pulley 75, over which, and said pulley 72, runs a crossed belt 76, indicated by dotted lines. A belt 77 runs over the pulleys 21$^a$, 10$^a$, 11$^a$, 4$^a$, an idle pulley 78, and the wide faced pulley 71.

The cleaned grain which falls upon the forward grain pan 52 directly from the cylinder and concave will be fed rearward onto the second grain pan, and from thence onto the sieve 38, and will pass through said sieve and, by the inclined bottom of the shoe 39, will be directed into the cleaned grain spout 47. Some of the pure grain, and a considerable amount of chaff and tailings, will fall onto the screen plate 28, and will be fed from thence onto the screen plate 29. The broken straw or light material will, as has already been stated, be discharged from the plate 29 at the rear end of the machine, while the pure grain and tailings will pass therethrough, and will be delivered onto the sieve 38.

To cause the screen plates 28 and 29 to advance the grain or stock rearward, under their oscillatory movements, their supporting links 30 must be so set that a required upward rise will be given to the said screen plates as they are thrust rearward. This adjustment must be properly taken care of at all times, and furthermore, for different kinds of grain, and for different conditions thereof, slightly different movements are required, which necessitates adjustments of the supporting links 30. In the arrangement described, as is evident, said supporting links may be given any desired adjustments and very quickly and securely set in the desired adjustments by means of the set levers 35. By similar devices, similar adjustments may be given to the links 40 and 53, which support, respectively, the shoe 39, and the pans 52.

The machine described, while of comparatively small cost, is thought to be extremely efficient for the purposes had in view, and to afford means for saving grain which is usually lost in the process of threshing. From what has been said, it will be understood that the machine described is capable of modification within the scope of my invention as herein set forth and claimed.

What I claim and desire to secure by Letters Patent of the United States is as follows:

1. In a threshing machine, a pair of independently mounted feed pans and a sieve equipped shoe, of a shaft having three cranks set one in advance of the other, and pitmen connecting one of said cranks to said shoe and the other two cranks one to each of said feed pans, substantially as described.

2. In a threshing machine, the combination with a sieve and means for vibrating the same and for holding the same within fixed limits for longitudinal movements, of links supporting the said sieve, link supports, and means for adjusting said link supports to vary the angularity of said links to said sieve, substantially as described.

3. In a threshing machine, the combination with feed pans and means for vibrating the same and for holding the same within fixed limits for longitudinal movements, of links supporting said pans, link supports, and means for adjusting said link supporters to vary the angularity of said links with respect to said pans, substantially as described.

4. In a machine of the character described, the combination with a sieve or similar device and means for vibrating the same and for holding the same within fixed limits for longitudinal movements, of adjusting rods, links pivoted to said rods and supporting said sieve, and means for moving said rods to vary the angularity of said links with respect to said sieve, substantially as described.

In testimony whereof I affix my signature in presence of two witnesses.

ALBERT T. BAKKEN.

Witnesses:
 ROBERT C. MABEY,
 F. D. MERCHANT.